(12) United States Patent
Izumi

(10) Patent No.: US 6,417,898 B1
(45) Date of Patent: Jul. 9, 2002

(54) LIQUID CRYSTAL DISPLAY DEVICE

(75) Inventor: Yoshihiro Izumi, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/046,815

(22) Filed: Mar. 24, 1998

(30) Foreign Application Priority Data

May 15, 1997 (JP) .............................................. 9-125497

(51) Int. Cl.[7] ........................ G02F 1/133; G02F 1/1333; G02F 1/1335
(52) U.S. Cl. ........................ 349/73; 349/158; 349/153; 349/106
(58) Field of Search ........................ 349/106, 73, 158, 349/153, 155, 150

(56) References Cited

U.S. PATENT DOCUMENTS

| | | | | |
|---|---|---|---|---|
| 5,177,627 A | * | 1/1993 | Ishiwata et al. | ............. 349/106 |
| 5,706,064 A | * | 1/1998 | Fukunaga et al. | ........... 349/106 |
| 5,808,719 A | * | 9/1998 | Fujiwara et al. | ............. 349/106 |
| 5,838,405 A | * | 11/1998 | Izumi et al. | ................... 349/73 |

FOREIGN PATENT DOCUMENTS

| | | |
|---|---|---|
| JP | 64-19920 | 1/1989 |
| JP | 64-32586 | 3/1989 |
| JP | 3-237432 | 10/1991 |
| JP | 4-28086 | 7/1992 |
| JP | 4-253028 | 9/1992 |
| JP | 5-5874 | 1/1993 |
| JP | 6-130220 | 5/1994 |
| JP | 7-072473 | 3/1995 |
| JP | 7-134290 | 5/1995 |
| JP | 8-015727 | 1/1996 |
| JP | 8-106086 | 4/1996 |
| JP | 8-122824 | 5/1996 |
| JP | 8-184709 | 7/1996 |
| JP | 8-184849 | 7/1996 |

OTHER PUBLICATIONS

Japanese Notice of Rejection.
Japanese Translation of Notice of Rejection (Ref. CA).
97–00347 Decision of Rejection (in Japanese) dated Jan. 15, 2002.
Translation of Decision of Rejection.

* cited by examiner

Primary Examiner—Toan Ton
(74) Attorney, Agent, or Firm—David G. Conlin; George W. Hartnell, III; Dike, Bronstein, Roberts & Cushman, LLP

(57) ABSTRACT

An active matrix substrate as one of substrates constituting a liquid crystal panel of a liquid crystal display device is made of a piece of substrate produced by connecting a plurality of small active matrix substrates side by side, and has color filters formed thereon. With this structure, when each of the small active matrix substrates has a maximum area obtainable by a conventional production line, a counter substrate disposed opposite to the active matrix substrate is larger than the maximum size producible by the conventional production line. However, since the color filters are formed on the small active matrix substrates, it is not necessary to newly provide a color filter production line corresponding to the larger counter substrate. Since new facility investment is not required, it is possible to provide a large-area liquid crystal display device at a low price.

20 Claims, 14 Drawing Sheets

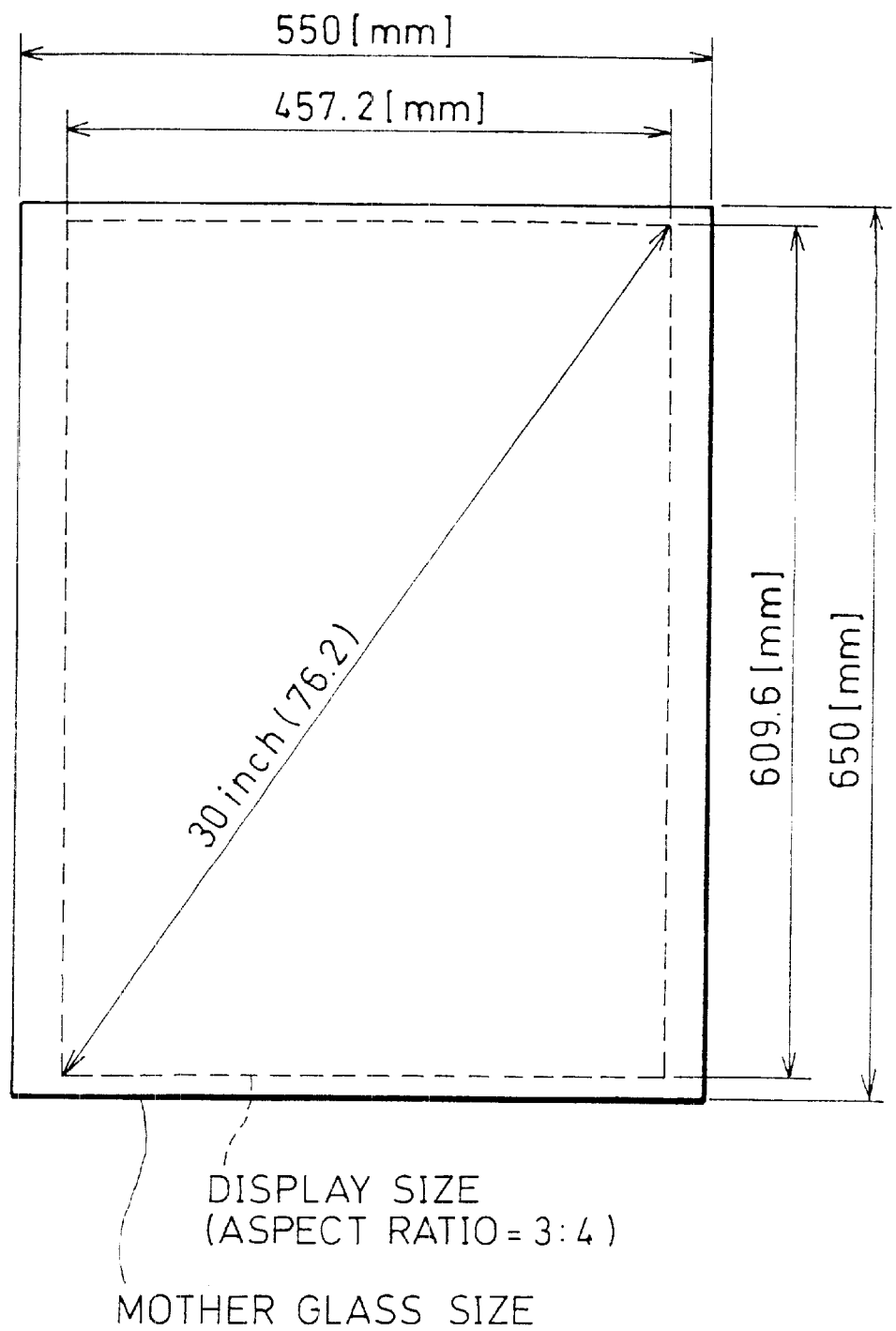

LIQUID CRYSTAL DISPLAY DEVICE

FIELD OF THE INVENTION

The present invention relates to a large-area liquid crystal display device for use in, for example, AV (audio-visual) equipment and OA (office automation) apparatuses.

BACKGROUND OF THE INVENTION

In recent years, there is demand for large-area, lightweight, thin, low-power-consuming, high-definition display devices for use in OA apparatuses and AV equipment such as home-use televisions. In order to meet such demand, development of practical, large-area display devices, including CRT (cathode ray tube), LCD (liquid crystal display), PDP (plasma display panel), EL (electroluminescence) display, and LED (light emitting diode) display, are in progress.

Among these display devices, liquid crystal display devices have great advantages over other devices because the liquid crystal display devices can have an extremely small thickness (depth), consume low power, and achieve a full-color display easily. Thus, recently, liquid crystal display devices have been used in variety of fields, and there is great demand for a large-area liquid crystal display device.

However, the manufacture of a large-area liquid crystal display device have problems, for example, an abrupt increase in the ratio of defects such as disconnection of signal lines and pixel defects during manufacturing. Moreover, such an increase of defects leads to a rise in the price. In order to solve the problems, Japanese publication of unexamined utility model applications, No. 191029/1985 (Jitsukaisho 60-191029) and No. 32586/1989 (Jitsukaisho 64-32586) propose a structure of a liquid crystal display device in which at least one of a pair of substrates provided with electrodes is made of a piece of large substrate produced by connecting a plurality of small substrates side by side.

For example, FIG. 13 shows the structure of a liquid crystal display device proposed by the above-mentioned publication, Jitsukaisho 64-32586. According to FIG. 13, a large-area liquid crystal display device is produced by bonding a piece of large active matrix substrate 51 and a piece of color filter substrate 54 having electrodes together so that a liquid crystal layer is placed therebetween. The large active matrix substrate 51 may be formed by connecting four pieces of divisional active matrix substrates 51a to 51d side by side and end to end. On each of the divisional active matrix substrates 51a to 51d, a pixel electrode 52 and a TFT 53 as an active element are provided at each intersection of electrode wiring that is produced in the form of matrix by a plurality of scanning electrodes 55 and signal lines 56.

In general, in an active matrix type liquid crystal display device, a minute active element is formed for each pixel on an active matrix substrate. It is extremely difficult to achieve a high yield of such an active matrix substrate if it has a large area. Therefore, with regard to productivity, it can be said that the above-mentioned publication discloses an efficient method of fabricating a large-area liquid crystal panel by producing active matrix substrates having active elements thereon as a plurality of small substrates, connecting the small substrates side by side to produce a piece of large active matrix substrate, and bonding the large active matrix substrate to a piece of large counter substrate provided with color filters.

Meanwhile, at present, 550 mm×650 mm is the maximum size of mother glass used in a production line of an active matrix type liquid crystal panel that is generally used as a monitor of, for example, note-book-type personal computers and desk-top-type personal computers. FIG. 14 shows a comparison of a 550 mm×650 mm mother glass and a display with a size (diagonal) of 30 inches (aspect ratio of 3:4). It can be understood from FIG. 14 that it is possible to produce, for example, active matrix substrates and color filter substrates of a size not greater than a display size with a diagonal of 30 inches, but physically impossible to produce active matrix substrates and color filter substrates with a display size greater than the 30-inch display size. Moreover, since the conventional production line is designed for the 550 mm×650 mm mother glass, a glass larger than 550 mm×650 mm cannot be used as the mother glass.

By the way, when producing a liquid crystal display device with a diagonal of 40 inches and the above-mentioned conventional structure by connecting two active matrix substrates together, it is preferred to use two pieces of about 29-inch substrate as the active matrix substrates, and one piece of 40-inch substrate as the color filter substrate. In this case, as described above, the 29-inch active matrix substrate can be produced easily using a conventional production line and mother glass, but it is impossible to produce the 40-inch color filter substrate. Therefore, in order to achieve the 40-inch liquid crystal display device, it is necessary to introduce a new color filter production line corresponding to a larger mother glass for the production of the 40-inch color filter substrate.

However, the production line of color filters usually requires a photolithography process corresponding to three colors, i.e., red, green and blue, of color filters. It is therefore necessary to newly provide all the manufacturing devices such as a color resist applying device, pattern exposure device, developing device, baking device, and transport device. Namely, considerable investment is required. Accordingly, like the above-mentioned conventional example, the production of a liquid crystal display device by connecting a plurality of active matrix substrates side by side was proposed for the purpose of providing a large-area liquid crystal display device at a low price. However, a liquid crystal display device having such a structure tends to be expensive.

SUMMARY OF THE INVENTION

It is an object of the present invention to provide at a low prices a liquid crystal display device by connecting a plurality of active matrix substrates side by side, without requiring a new color filter production line corresponding to a large substrate even when each active matrix substrate has a maximum area obtainable from a conventional production line.

In order to achieve the object, a liquid crystal display device of the present invention includes:

an active matrix substrate having electrode wiring produced in a matrix form by a plurality of scanning lines and a plurality of signal lines arranged to intersect the scanning lines, and a pixel electrode and an active element for driving the pixel electrode at each intersection of the electrode wiring, the active matrix substrate being a piece of substrate produced by connecting a plurality of divisional substrates side by side, each divisional substrate being provided with color filters corresponding to the pixel electrodes, respectively;

a counter substrate provided with a common electrode, the counter substrate being disposed to face the active matrix substrate; and a liquid crystal layer placed between the active matrix substrate and the counter substrate.

In this structure, the active matrix substrate is composed of a plurality of divisional substrates, and each divisional substrate is provided with color filters. Thus, there is no need to mount color filters on a piece of large counter substrate that is disposed to face the active matrix substrate. Therefore, when an active matrix substrate having a maximum area obtainable from a conventional production line is used as a divisional substrate, it is not necessary to form color filters on the counter substrate of a larger size. Namely, there is no need to introduce a new color filter production line corresponding to the larger counter substrate.

For example, when two pieces of active matrix substrate having a diagonal of 29 inches and color filters are used as the divisional substrates and connected to each other to produce a liquid crystal display device with a diagonal of 40 inches, the color filters are produced by a conventional production line for producing the 29-inch active matrix substrate. Hence, unlike the production of a conventional liquid crystal display device having a counter substrate provided with color filters, it is not necessary to introduce a color filter production line using a large mother glass with a diagonal of about 40 inches. Namely, it is possible to use the conventional production line at most even when producing a 40-inch liquid crystal display device.

In this case, it is also necessary to form a common electrode over the substantially entire surface of the 40-inch substrate. However, the formation of such a common electrode is carried out by simply introducing a film deposition system like a sputtering device corresponding to a large substrate. The cost of introducing such a film deposition system is much less than the investment in the color filter production line.

For a fuller understanding of the nature and advantages of the invention, reference should be made to the ensuing detailed description taken in conjunction with the accompanying drawings.

BRIEF DESCRIPTION OF THE DRAWINGS

FIG. 14 is an explanatory view showing a comparison between the size of a 550 mm×650 mm mother glass and a display size with a diagonal of 30 inches.

DESCRIPTION OF THE PREFERRED EMBODIMENTS

Embodiment 1

The following description will explain an embodiment of the present invention with reference to the drawings.

A liquid crystal display device according to this embodiment includes a liquid crystal panel, a pair of polarizers provided on the substantially entire front and back surfaces of the liquid crystal panel, a back light for irradiating the liquid crystal panel from the back side, and a driving circuit for driving the liquid crystal panel.

Figure 1:
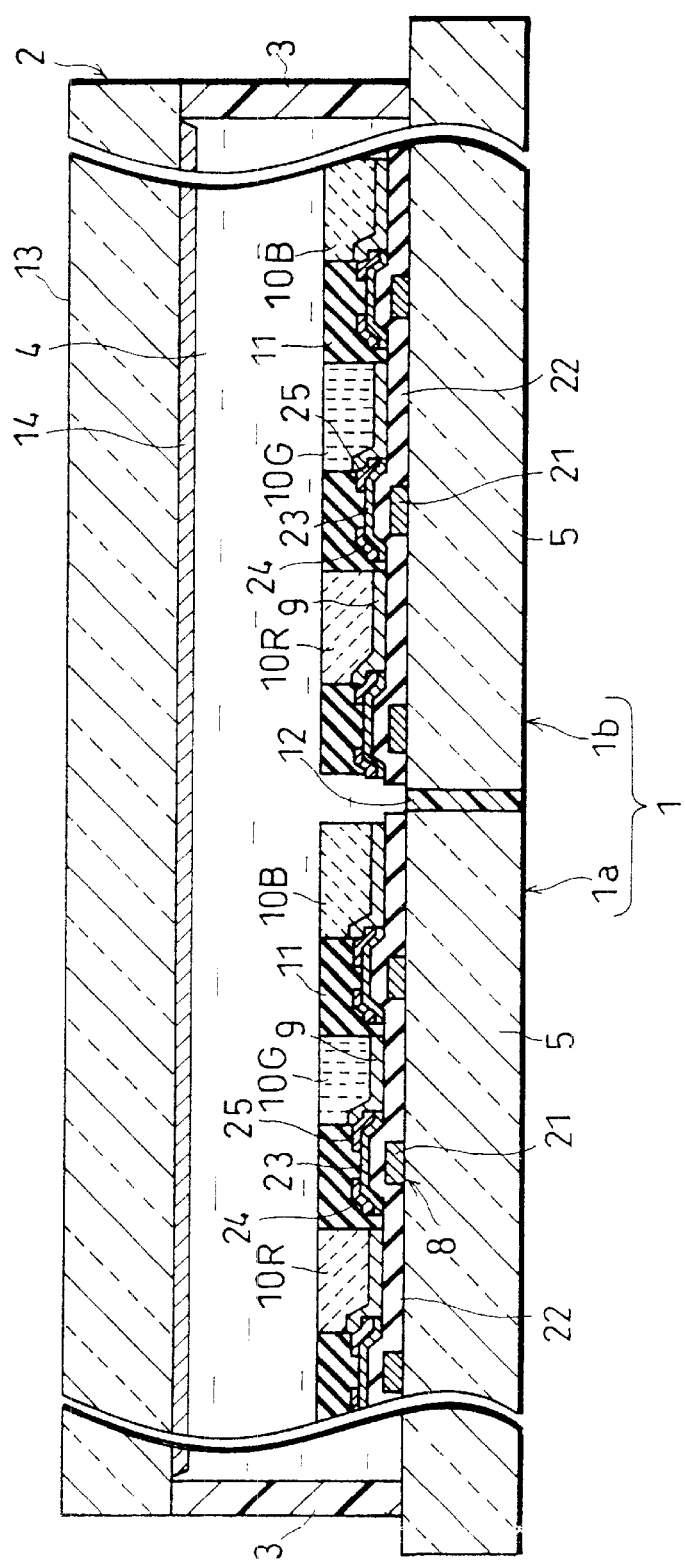
FIG. 1 is a cross section of a liquid crystal panel of a liquid crystal display device according to one embodiment of the present invention.

As illustrated in FIG. 1, the liquid crystal panel of this liquid crystal display device is fabricated by bonding a piece of active matrix substrate 1 and a piece of counter substrate 2 with a sealant 3, and sealing a liquid crystal layer 4 in the space therebetween. The active matrix substrate 1 is produced by connecting two small substrates (divisional substrates) 1a and 1b side by side.

Figure 2:
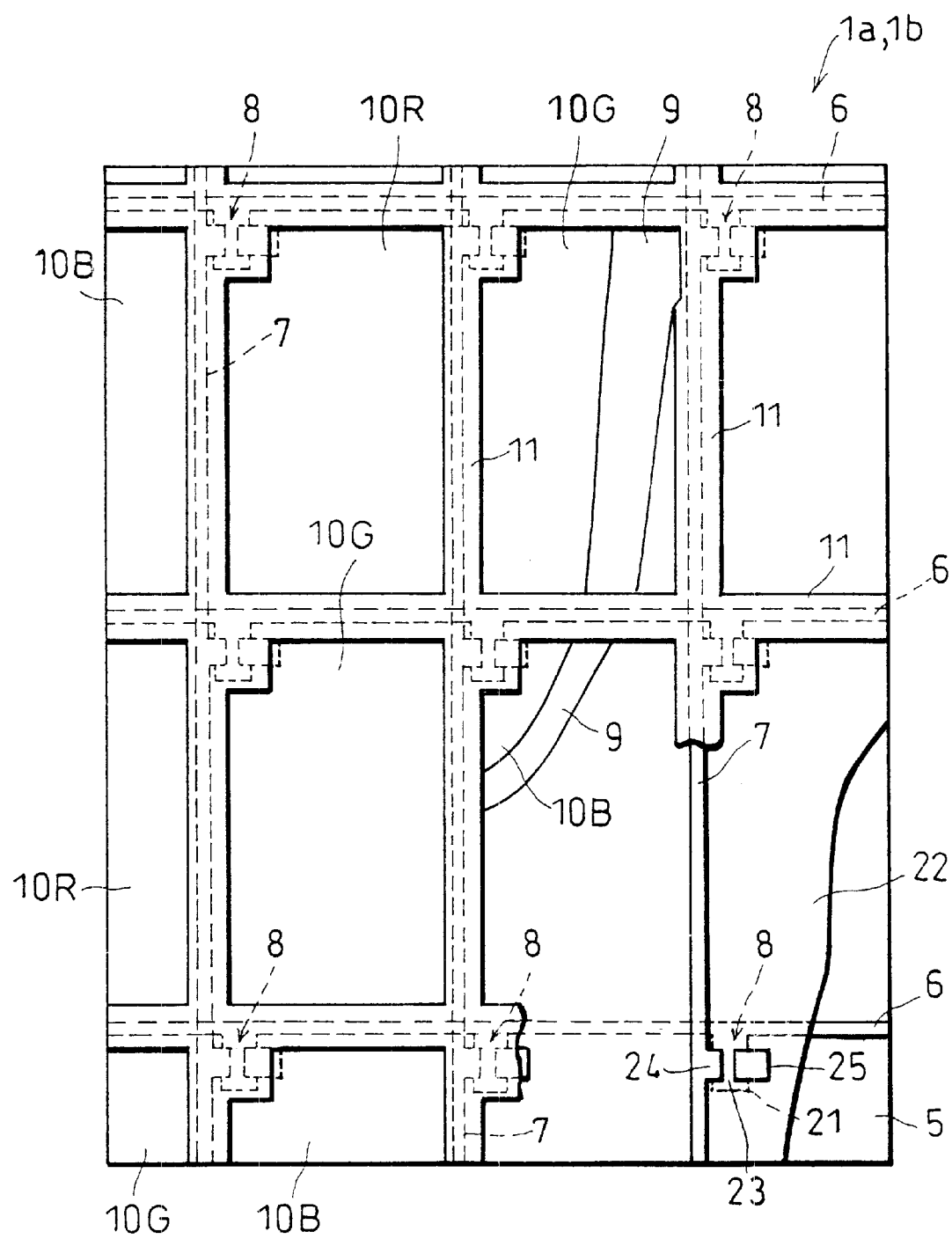
FIG. 2 is a plan view of the liquid crystal panel.

On each of the two small substrates 1a, 1b constituting the active matrix substrate 1, as shown in FIG. 2, a plurality of scanning lines 6 and a plurality of signal lines 7 are mounted on a transparent substrate 5 made of, for example, glass. The signal lines 7 are arranged to cross the scanning lines 6 at right angles. A pixel electrode 9 formed by a transparent conducting film like ITO (indium tin oxide), and a TFT (thin film transistor) 8 as an active element for driving the pixel electrode 9 are provided at each intersection of electrode wiring produced in a matrix form by the scanning lines 6 and signal lines 7.

The TFT 8 controls the supply of a data signal to the pixel electrode 9. When an ON signal is input through the scanning line 6, the TFT 8 applies to the pixel electrode 9 a data signal input through the signal line 7.

As illustrated in the cross section of FIG. 1, the TFT 8 includes a gate electrode 21 formed on the transparent substrate 5, a gate insulating film 22 formed over the substantially entire surface of the gate electrode 21, a semiconducting layer 23 formed on the gate insulating film 22, and a source electrode 24 and a drain electrode 25 formed on the semiconducting layer 23. For example, the gate insulating film 22 is formed by SiN, and the semiconducting layer 23 is made of a-Si:H.

The TFT 8 is connected to the scanning line 6 and signal line 7 by connecting the gate electrode 21 to the scanning line 6 and connecting the source electrode 24 to the signal line 7. The pixel electrode 9 is formed on the gate insulating film 22 so that the pixel electrode 9 paretically overlaps the drain electrode 25. Thus, the pixel electrode 9 is connected to the drain electrode 25.

Moreover, on each of the small substrates 1a and 1b, as illustrated in FIG. 2, red filters 10R, green filters 10G and blue filters 10B are disposed as the color filters on the pixel electrodes 9. Each of the color filters 10R, 10G, 10B is formed in substantially the same shape as the pixel electrode 9. Furthermore, an insulating protective film 11 is formed to cover the scanning lines 6, signal lines 7 and TFTs 8. The insulating protective film 11 is produced in a matrix form by SiN, acrylic resin, etc.

The two small substrates 1a and 1b having the above-mentioned structure are arranged side by side and connected to each other with a substrate joint 12 formed by a transparent adhesive agent. At this time, the two small substrates 1a and 1b are bonded together so that the pitch of the plurality of pixel electrodes 9 arranged on the small substrates 1a, 1b is uniform even at the pixel electrodes 9 that face each other with the substrate joint 12 therebetween.

As the transparent adhesive agent for connecting the small substrates 1a and 1b, it is necessary to use a material having small optical anisotropy and substantially the same refractive index as the glass material used for the transparent substrate 5. The reason for limiting the material of the transparent adhesive agent is to prevent refraction and scattering of light and modulation of polarization characteristics at the substrate joint 12, and make the substrate joint 12 less noticeable. By satisfying this requirement, it is possible to achieve continuity between the substrate joint 12 and small substrates 1a, 1b.

Figure 3:
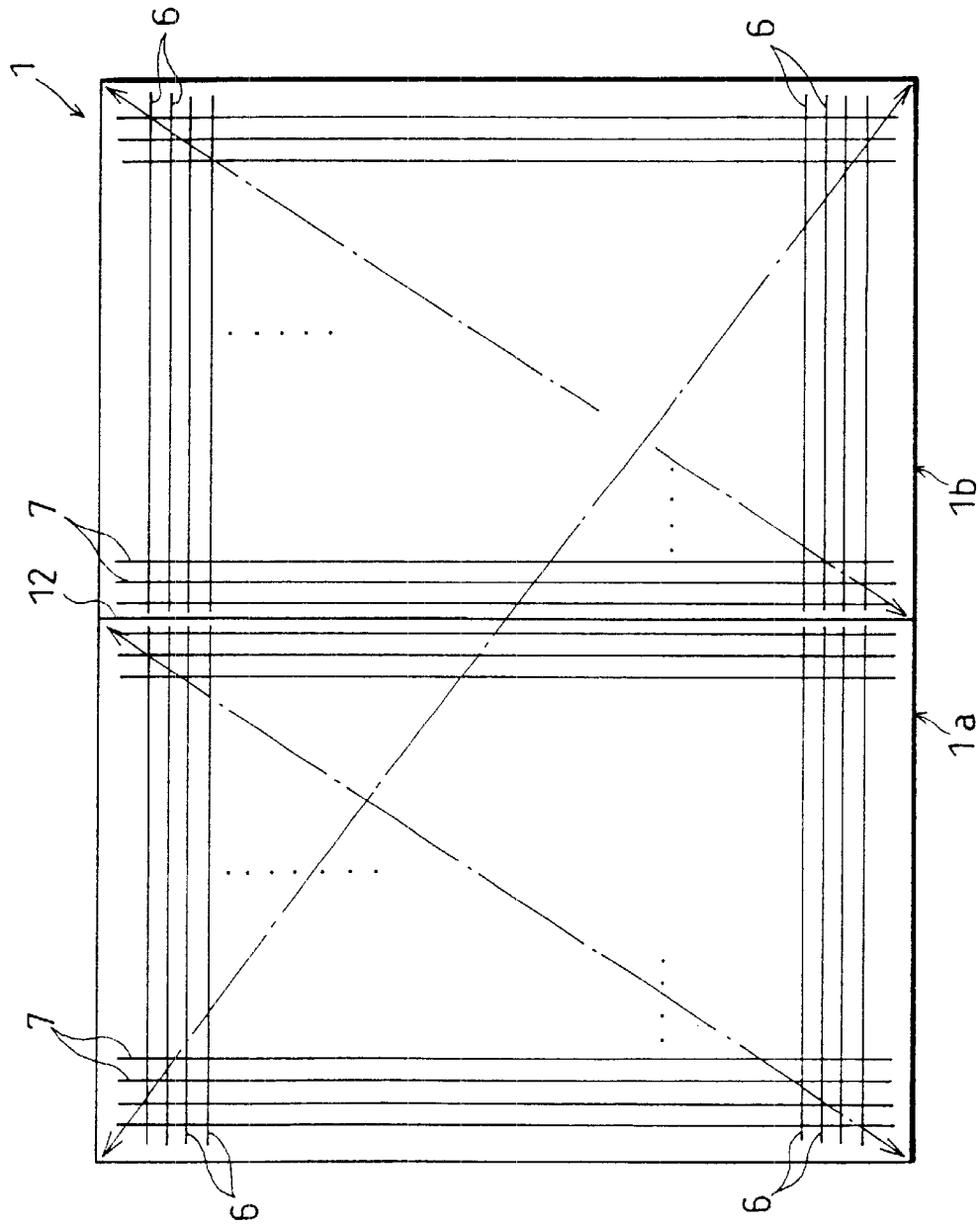
FIG. 3 is a plan view of active matrix substrates constituting the liquid crystal panel.

The diagonal of each of the small substrates 1a, 1b is 29 inches. By connecting the small substrates 1a, 1b as shown in FIG. 3, the entire display area of the active matrix substrate 1 has a diagonal of 40 inches.

On the other hand, as illustrated in FIG. 1, on the counter substrate 2, a common electrode 14 made of a transparent conducting film such as ITO is arranged to cover the substantially entire surface of a transparent substrate 13 formed by a single piece of glass with a diagonal of 40 inches.

Although not particularly shown in the drawings, an alignment film made of polyimide, etc. for aligning liquid crystals is formed on each of the facing surfaces (having thereon the pixel electrodes 9 or common electrode 14) of the active matrix 1 and counter substrate 2. An aligning treatment such as rubbing has been applied to the alignment films.

Referring now to FIGS. 4(a) to 4(d), an example of the process of forming color filters will be explained. Here, an electrodeposition method is described as an example. In this method, color filters are formed by electrodepositing red, green and blue filter materials on the pixel electrodes. However, it is possible to use various methods for forming color filters as to be described later.

Figure 4A:
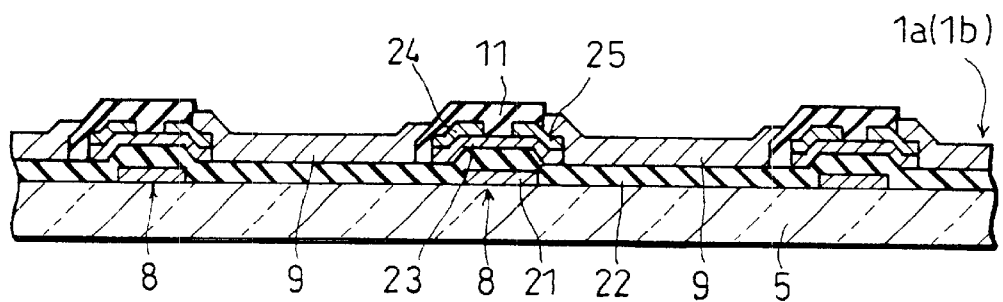
FIGS. 4(a) to 4(d) are cross sections showing the processes for forming color filters on the active matrix substrate.

First, as illustrated in FIG. 4(a), the scanning lines 6, signal lines 7, and TFTs 8 are produced on the transparent substrate 5 by a known method. Then, the insulating protective film 11 is formed on the scanning lines 6, signal lines 7, and TFTs 8 by photolithography. Additionally, the pixel electrodes 9 are formed on the gate insulating film 22. In FIGS. 4(a) to 4(d), the scanning lines 6 and signal lines 7 are not illustrated.

Figure 4B:
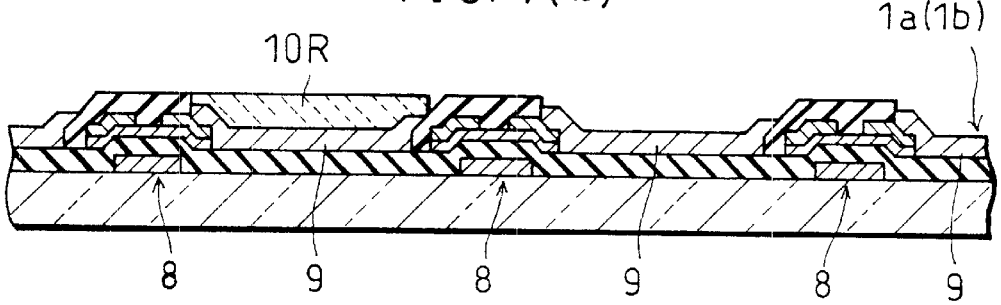

Next, as shown in FIG. 4(b), the red filters 10R are formed by electrodepositing a red filter material on predetermined pixel electrodes 9 for displaying red pixels. The electrodeposition of the filter material is performed by dipping the small substrate 1a (1b) into a liquid produced by dissolving or dispersing a polymeric resin and pigment as the filter material in water and an organic solvent, and by applying a voltage to the predetermined pixel electrodes 9.

In order to apply the voltage to the predetermined pixel electrodes 9, a scanning signal is sequentially applied to the scanning lines 6, and an electrodepositing voltage is applied to the signal lines 7 corresponding to the predetermined pixel electrodes 9 in synchronization with the application of the scanning signal. Consequently, whenever a scanning line 6 is selected sequentially, the voltage from the signal lines 7 is applied only to the predetermined pixel electrodes 9 among the pixel electrodes 9 located along the selected scanning line 6. As a result, the filter material (polymeric resin and pigment) in the liquid is deposited over the entire surface of each of the pixel electrodes 9 to which the voltage has been applied.

In this case, since the portions of the signal lines 7 and TFTs 8 other than the pixel electrode joints are covered with the-insulating protective film 11, the filter material can never adhere to the signal lines 7 and TFTs 8.

After electrodepositing the red filter material on the predetermined pixel electrodes 9 as mentioned above, the electrodeposited film of the filter material is dried, thereby completing the red filters 10R. The electrodeposited film can be stabilized by applying heat treatment, if necessary.

Figure 4C:
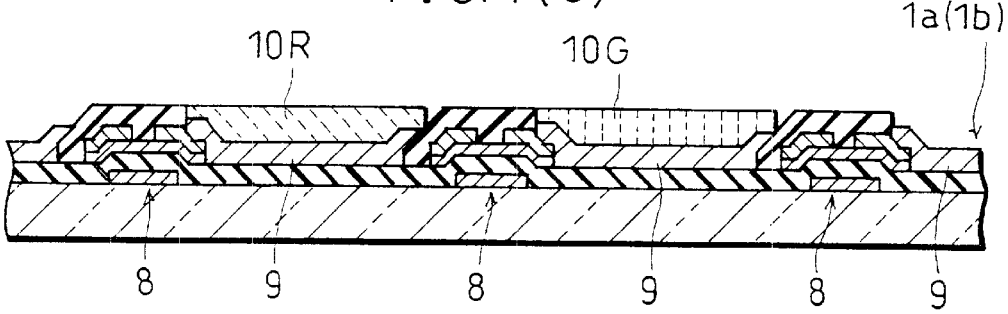
Figure 4D:
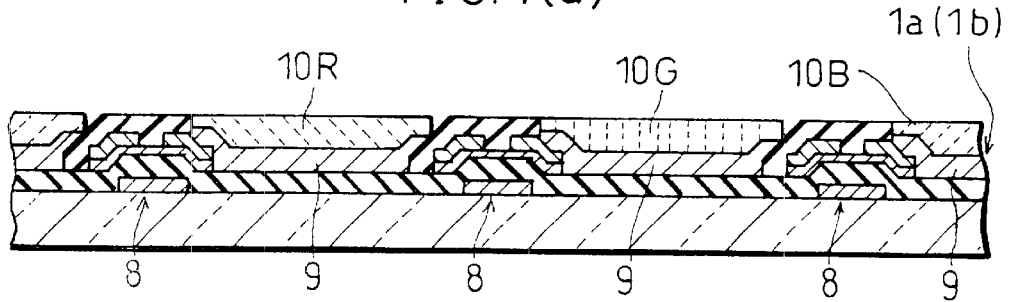

Next, as shown in FIG. 4(c), the green filters 10G are formed by electrodepositing a green filter material on predetermined pixel electrodes 9 for displaying green pixels, other than the pixel electrodes 9 on which the red filters 10R are formed. Subsequently, as shown in FIG. 4(d), the blue filters 10B are formed by electrodepositing a blue filter material on the remaining pixel electrodes, i.e., predetermined pixel electrodes 9 for displaying blue pixels.

Like the formation of the red filters 10R, the green filters 10G and blue filters 10B are formed by dipping the small substrate 1a (1b) into a liquid in which a polymeric resin and pigment as the filter material are dissolved or dispersed, and by applying an electrodepositing voltage selectively to the signal lines 7 in synchronization with the application of the scanning signal to the scanning lines 6.

For example, a process for producing color filters by such electrodeposition is described in detail in Japanese publication of unexamined patent application No. 5874/1993 (Tokukaihei 5-5874). As for the process for producing color filters, it is possible to use, for example, the photomechanical, dying, ink jetting, photolithography methods.

For example, Japanese publication of unexamined patent application No. 237432/1991 (Tokukaihei 3-237432) discloses the photomechanical method. Japanese publication of unexamined patent application No. 134290/1995 (Tokukaihei 7-134290) discloses the ink jetting method. Japanese publication of unexamined patent application No. 122824/1996 (Tokukaihei 8-122824) discloses the photolithography method.

The color filters usually have insulating properties. Therefore, when the color filters are provided on the pixel electrodes 9, a loss of a driving voltage to be applied to the liquid crystal layer 4 (i.e., the voltage applied across the pixel electrodes 9 and the common electrode 4) sometimes occurs at the color filters. Hence, in the liquid crystal display device of this embodiment, a driving voltage determined by considering the voltage loss at the color filters is applied.

As a measure to prevent the voltage loss at the color filters, there are a variety methods. For example, the voltage loss can be prevented by forming pixel electrodes on the color filters. More specifically, by producing a through-hole in a part of the color filters formed by the above-mentioned electrodeposition, for example, and forming another layer of pixel electrodes on the color filters.

As another method, the color filters are formed by a conducting material. For example, as disclosed in Japanese publication of unexamined patent application No. 130220/1994 (Tokukaihei 6-130220), when an electrodeposition method using micelle electrolyte is used, it is possible to form conducting color filters on the pixel electrodes. This method can easily solve the above-mentioned problem relating to the voltage loss at the color filters.

As other method, it is possible to impart a conducting property to the color filters by mixing a transparent conducting material such as ITO and $SnO_2$ into the color filter material.

As described above, in the liquid crystal panel of this liquid crystal display device, the active matrix substrate 1 which holds the liquid crystal layer 4 between the counter substrate 2 and the active matrix substrate 1 is a piece of substrate produced by connecting the small substrates 1a, 1b as active matrix substrates together, and color filters are formed on the small substrates 1a, 1b.

Therefore, for the liquid crystal panel of this liquid crystal display device, the active matrix substrate 1 with a diagonal of 40 inches can be fabricated by connecting the small substrates 1a, 1b produced by a conventional production line using a 550 mm×650 mm mother glass. Therefore, the counter substrate production line using a larger mother glass with a diagonal of 40 inches requires only a sputtering device for forming the common electrode 14 on the counter substrate 2.

For example, in a conventional structure where color filters are formed on the counter substrate 2, in order to produce color filters on a mother glass with a diagonal of 40 inches, it is necessary to install a color filter production line corresponding to such a large substrate. Accordingly, the structure of the liquid crystal display device of this embodiment can achieve a significant reduction in investment, and provide a large-area liquid crystal display device at a low price.

Moreover, in the structure of the liquid crystal display device of this embodiment, only the common electrode 14 is formed on the counter substrate 2, Thus, unlike a conventional structure where the color filters are formed on the counter substrate 2, when bonding the active matrix substrate 1 and counter substrate 2 together, the structure of the present invention does not require a fine adjustment for positioning the pixels.

In this embodiment, two small substrates 1a, 1b are connected to each other to form a single substrate, and the resultant substrate is disposed to face the counter substrate 2. However, it is possible to obtain the same effect as that of Embodiment 1 by a structure formed by a single piece of substrate produced by connecting four small substrates side by side and end to end, and a piece of counter substrate facing the single piece of substrate.

Figure 5:
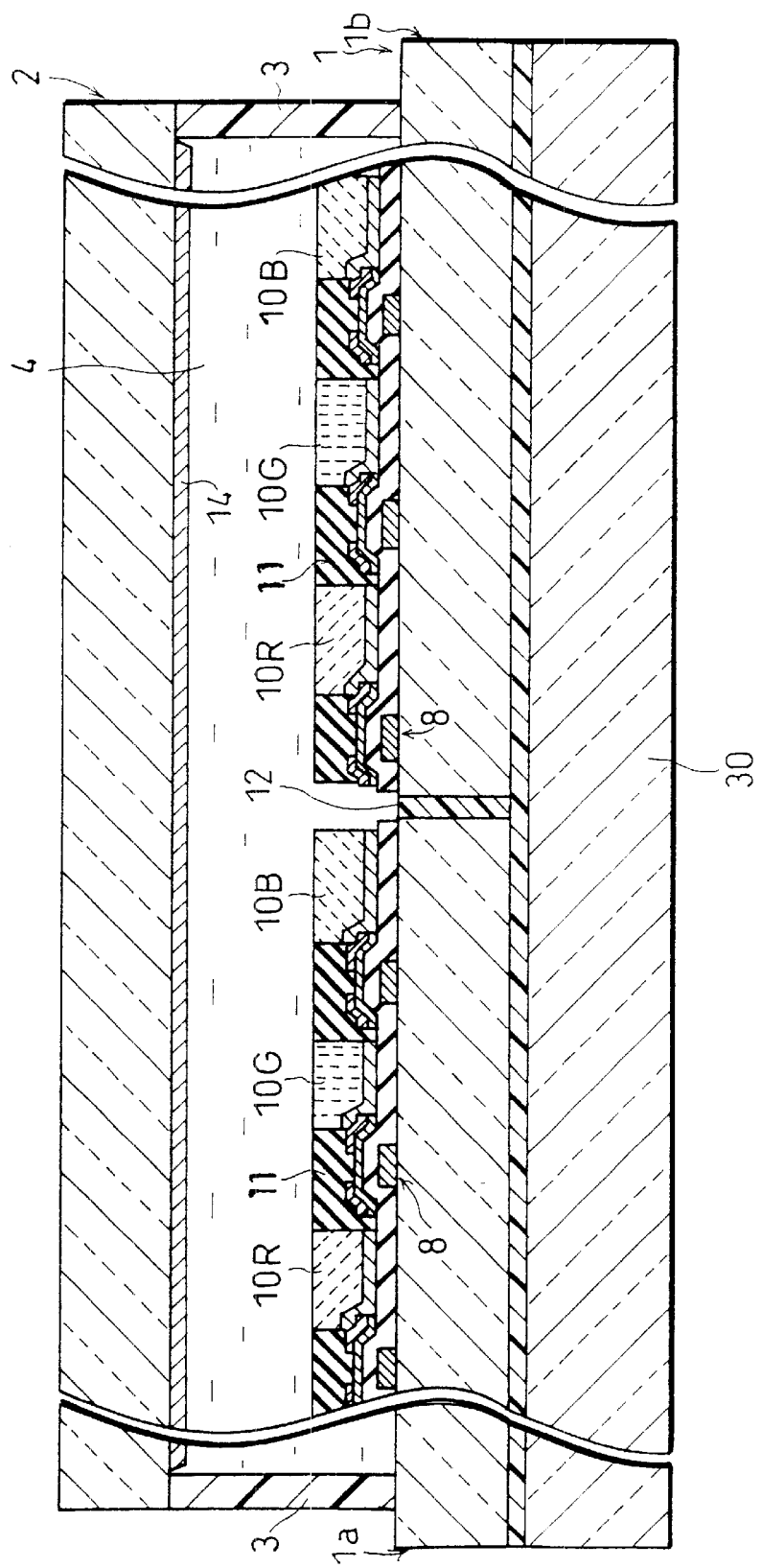
FIG. 5 is a cross section of a liquid crystal panel of a liquid crystal display device according to another embodiment of the present invention.

In addition, in order to improve the mechanical strength of the substrate joint 12 in the active matrix substrate 1, i.e., increase the mechanical strength of the liquid crystal display device so as to achieve improved reliability, as illustrated in FIG. 5, a reinforcing substrate 30 made of a transparent substrate such as glass may be attached to the substantially entire outside surface of the active matrix substrate 1 with a transparent adhesive agent. As the transparent adhesive agent, it is possible to use an ultraviolet-setting adhesive agent, or an intermediate film for laminating glass, for example, butyral film.

Needless to say, liquid crystal display devices according to other embodiments of the present invention described below can adopt the structure formed by four small substrates that are connected side by side and end to end, or the structure formed by attaching a reinforcing substrate 30.

Embodiment 2

Referring now to the drawings, the following description will explain another embodiment of the present invention. The members having the same function as in the above-mentioned embodiment will be designated by the same code and their description will be omitted.

Figure 6:
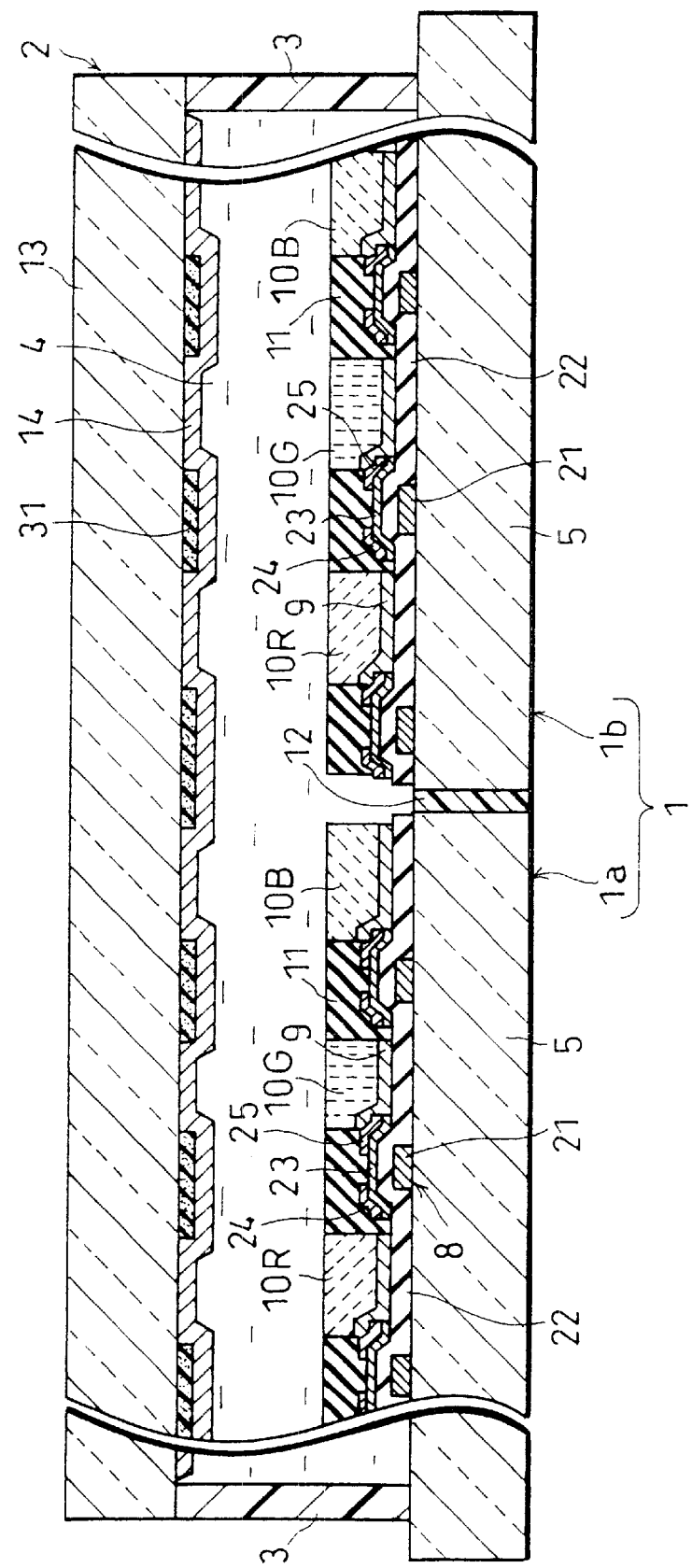
FIG. 6 is a cross section of a liquid crystal panel of a liquid crystal display device according to still another embodiment of the present invention.

The liquid crystal panel of a liquid crystal display device according to this embodiment has the structure shown in FIG. 6. Like the liquid crystal display panel shown in FIG. 1 of Embodiment 1, this liquid crystal panel basically includes a piece of active matrix substrate 1 produced by connecting two small substrates 1a, 1b, and red filters 10R, green filters 10G and blue filters 10B as color filters mounted on the small substrates 1a, 1b. Therefore, similarly to the liquid crystal display device of Embodiment 1, this embodiment can provide a large-area liquid crystal display device at a low price. The above-mentioned basic structure is adopted in various embodiments described below to produce the same effect. Therefore, in the following description, the explanation of the same effect will be omitted, and only different structures and the effects produced by such different structures will be explained.

As illustrated in FIG. 6, the difference in the structure between the liquid crystal display device of this embodiment and that of Embodiment 1 is black matrix (an inter-pixel light blocking film) 31 formed on the counter substrate 2. The function of the black matrix 31 is to separate colors of the pixels and block the incidence of external light, thereby preventing changes in the characteristics of TFTs 8 due to the light.

The black matrix 31 is formed to cover the scanning electrodes 6, signal electrodes 7, and TFTs 8 arranged in the form of matrix on the active matrix substrate 1 as shown in FIG. 2.

As the material for the black matrix 31, it is possible to use black resins capable of being patterned by photolithography, black inorganic materials such as a-SiGe:H, or metal films like chrome.

However, since the black matrix 31 is formed on the counter substrate 2 with a diagonal of 40 inches, it is necessary to include at least a device for forming the black matrix 31 as well as the sputtering device for forming the common electrode 14 in the production line corresponding to the large mother glass.

In this case, as shown in FIG. 6, it is preferred to form the black matrix 31 to cover the substrate joint 12 in the active matrix substrate 1. By forming the black matrix 31 in such a manner, it is possible to prevent a viewer in front of the liquid crystal display device from seeing the light of the back light coming through the substrate joint, thereby making the connecting line in the active matrix substrate 1 less noticeable. It is thus possible to provide a natural image without awkwardness, and achieve further improved display quality.

Embodiment 3

Referring now to the drawings, the following description will explain another embodiment of the present invention. The members having the same function as in the above-mentioned embodiment will be designated by the same code and their description will be omitted.

Figure 7:
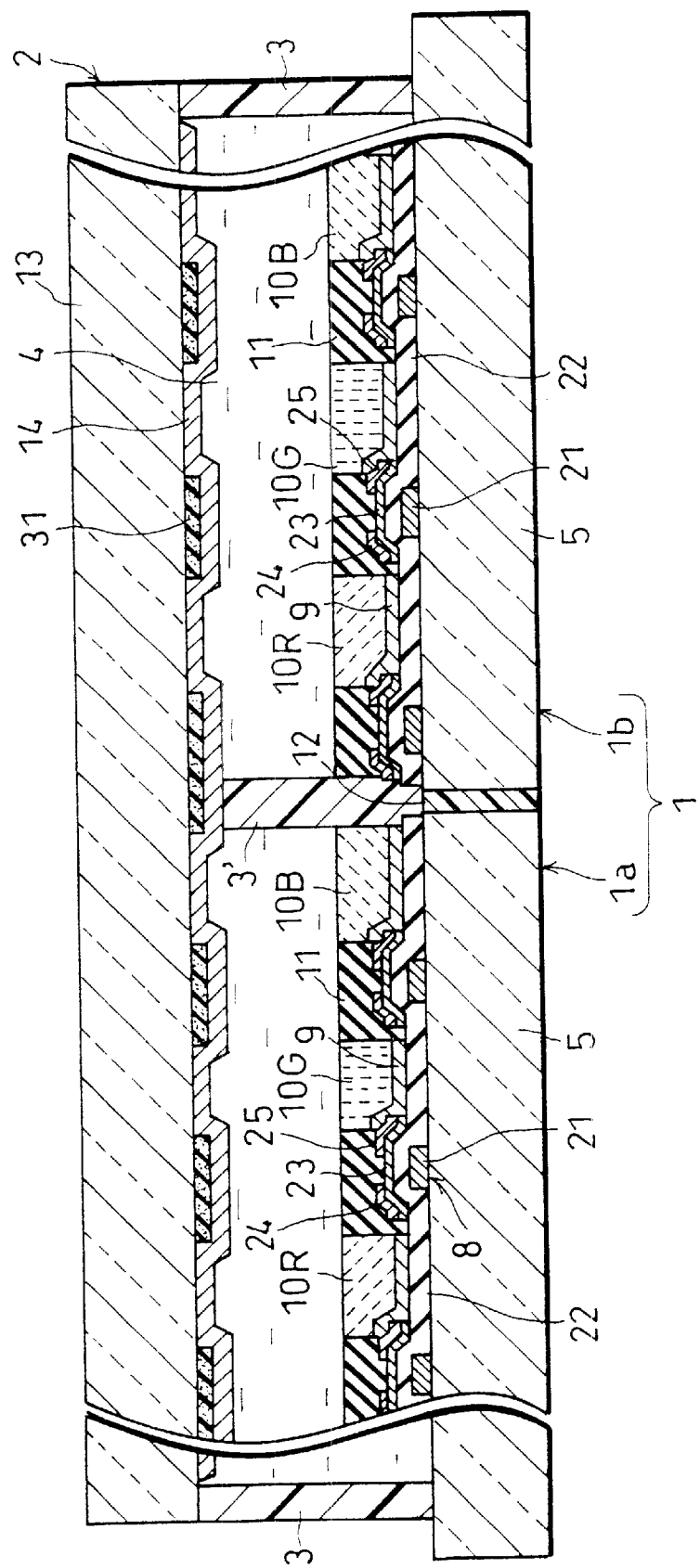
FIG. 7 is a cross section of a liquid crystal panel of a liquid crystal display device according to yet another embodiment of the present invention.

The liquid crystal panel of a liquid crystal display device according to this embodiment has the structure shown in FIG. 7. In addition to the structure of the liquid crystal panel of Embodiment 2 shown in FIG. 6, the liquid crystal panel of Embodiment 3 includes a seal layer 3' along the substrate joint 12. The seal layer 3' fills the gap between the active matrix substrate 1 and the counter substrate 2.

As the material for the seal layer 3', it is possible to use the same material as the sealant 3 that is placed in the periphery of the display area for the purpose of bonding the active matrix substrate 1 and the counter substrate 2. For example, thermosetting epoxy sealants and ultraviolet-setting acrylic sealants can be used.

This structure can improve the mechanical strength of the substrate joint 12. Moreover, when a spacing member such as a spacer is included in the seal layer 3', it is possible to maintain a uniform distance between the active matrix substrate 1 and the counter substrate 2, thereby reducing variations in the thickness of the liquid crystal layer 4.

Furthermore, in order to prevent variations in the thickness of the liquid crystal layer 4 over the entire display area of the liquid crystal display device, it is possible to provide the seal layer 3' not only along the substrate joint, but also at a plurality of portions in the form of islands on the black matrix 31 formed on the entire display area. Namely, the seal layer 3' is provided at a plurality of positions discontinuously so as not to prevent the injection of liquid crystals during the production of the liquid crystal display device.

Embodiment 4

Figure 8:
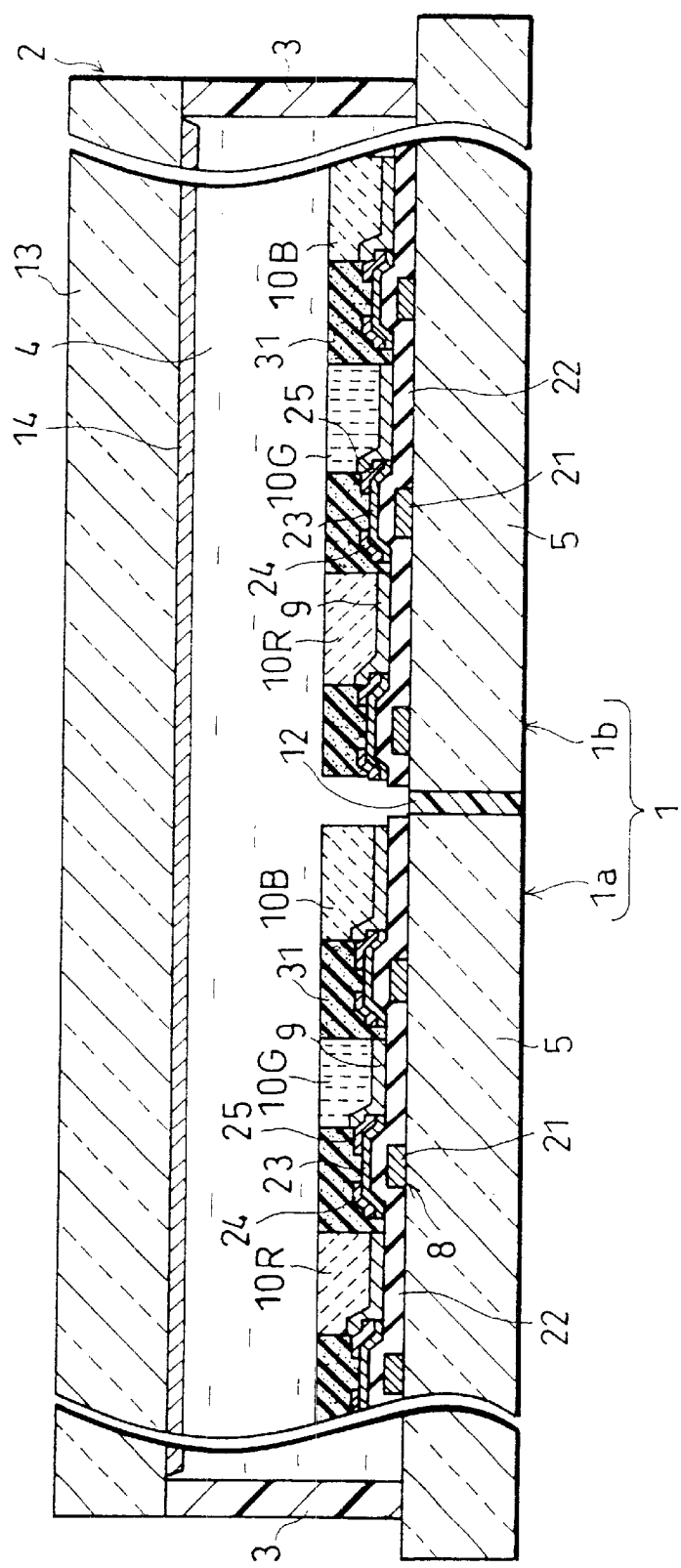
FIG. 8 is a cross section of a liquid crystal panel of a liquid crystal display device according to other embodiment of the present invention.

Referring now to FIG. 8, the following description will explain another embodiment of the present invention. The members having the same function as in the above-mentioned embodiment will be designated by the same code and their description will be omitted.

The liquid crystal panel of a liquid crystal display device according to this embodiment has the structure shown in FIG. 8. According to the structure of the liquid crystal panel of Embodiment 2 shown in FIG. 6, the black matrix 31 is formed on the counter substrate 2. However, in the liquid crystal panel of Embodiment 3, the black matrix 31 is formed on the active matrix substrate 1.

In this embodiment, the black matrix 31 is provided instead of the insulating protective film 11 of the liquid crystal panel of Embodiment 1 shown in FIG. 1. If the black matrix 31 does not have an insulating property, the black matrix 31 may be layered on the insulating protective film 11 so that the black matrix 31 form the same pattern as the insulating protective film 11.

As the material for the black matrix 31, it is possible to use those listed for the black matrix 31 of Embodiment 2.

In particular, in this liquid crystal display device, since the black matrix 31 is formed on the active matrix substrate 1, unlike the liquid crystal display device of Embodiment 2, there is no need to include a device for forming the black matrix 31 in the production line corresponding to the large mother glass with a diagonal of 40 inches.

Namely, for the formation of the black matrix 31 on the active matrix substrate 1, it is possible to use a conventional manufacturing device in the process of producing the small substrates 1a, 1b. For example, when the black matrix 31 is formed by a black resin, a conventional resist application device or exposure device can be used. In the case when the black matrix 31 is a black inorganic material such as a-SiGe:H, it is possible to use a conventional thin film deposition system (plasma chemical vapor deposition system) and dry etching device which are used for the production of the TFTs 8.

Embodiment 5

Referring now to the drawings, the following description will explain another embodiment of the present invention. The members having the same function as in the above-mentioned embodiment will be designated by the same code and their description will be omitted.

Figure 9:
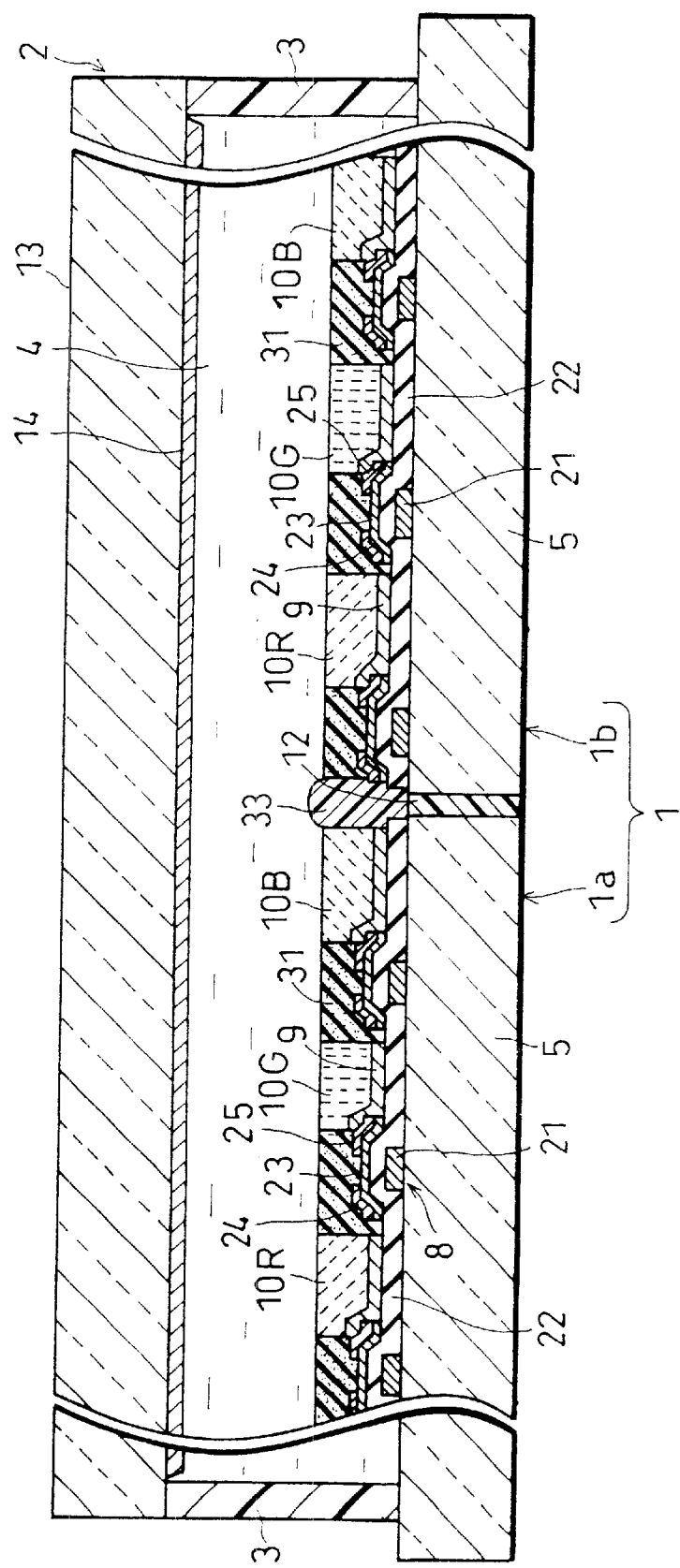
FIG. 9 is a cross section of a liquid crystal panel of a liquid crystal display device according to other embodiment of the present invention.

The liquid crystal panel of a liquid crystal display device according to this embodiment has the structure shown in FIG. 9. In addition to the structure of the liquid crystal panel of Embodiment 4 shown in FIG. 8, the liquid crystal panel of Embodiment 5 includes a light blocking section (joint light blocking film) 33 along the substrate joint 12. The light blocking section 33 covers the substrate joint 12.

As the material for the light blocking section 33, any materials can be used if they are black. For example, it is possible to use silicone rubber containing pigment such as carbon black. In this case, it is preferred to use a dispenser, and draw a straight line with the silicone rubber along the substrate joint 12. It is also possible to apply a black resist using a printing technique.

Such a light blocking section 33 can prevent a viewer in front of the liquid crystal display device from seeing light of the back light coming through the substrate joint 12, thereby making the connecting line in the active matrix substrate 1 less noticeable. Consequently, the structure of this embodiment can provide a natural image without awkwardness, and achieve further improved display quality.

Embodiment 6

Referring now to the drawings, the following description will explain another embodiment of the present invention. The members having the same function as in the above-mentioned embodiment will be designated by the same code and their description will be omitted.

Figure 10:
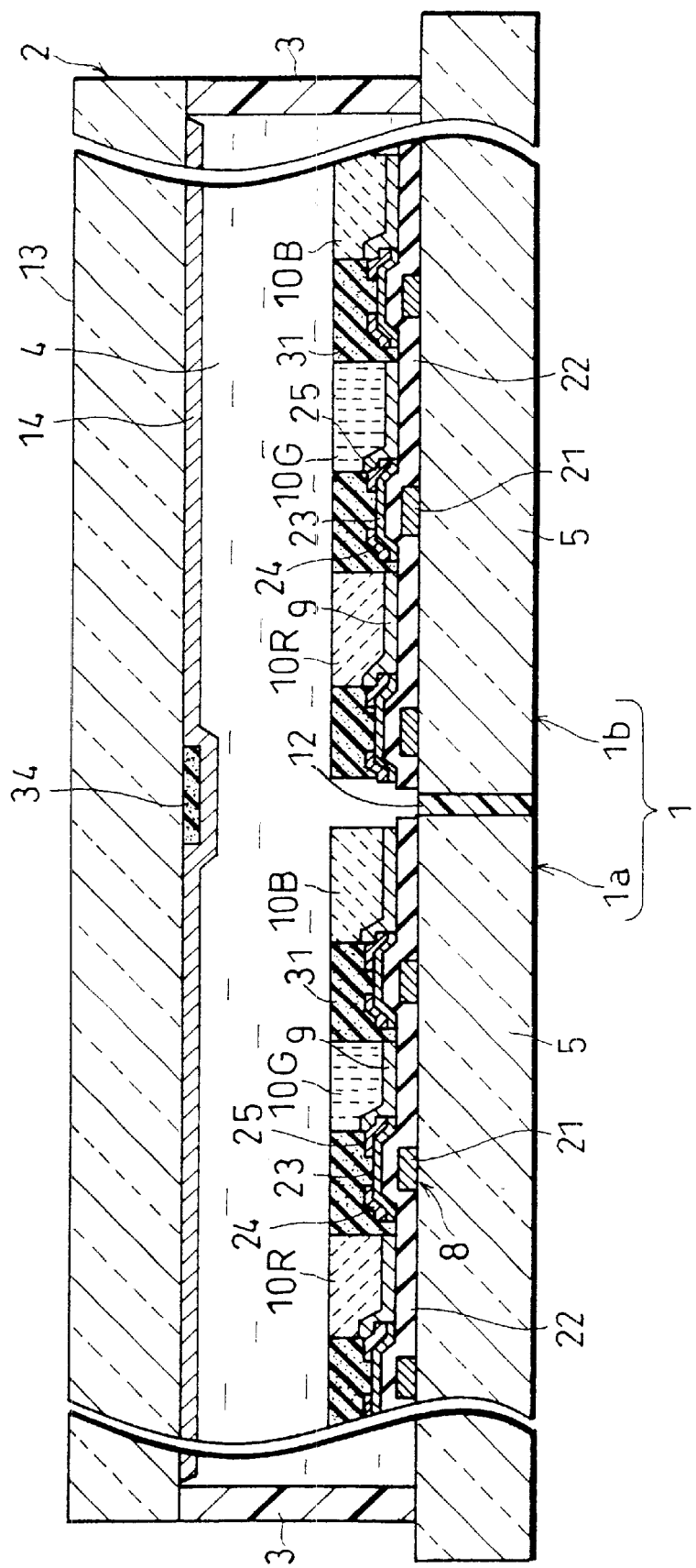
FIG. 10 is a cross section of a liquid crystal panel of a liquid crystal display device according to other embodiment of the present invention.

The liquid crystal panel of a liquid crystal display device according to this embodiment has the structure shown in FIG. 10. In addition to the structure of the liquid crystal panel of Embodiment 5 shown in FIG. 9, the liquid crystal panel of Embodiment 6 includes a light blocking section (joint light blocking film) 34 on the counter substrate 2 at a position corresponding to the substrate joint 12, instead of the light blocking section 33 provided on the active matrix substrate 1 to cover the substrate joint 12.

As the material for the light blocking section 34, the same material as that used for the black matrix 31 formed on the counter substrate 2 in Embodiment 2 can be used. It is also possible to form the light blocking section 34 by applying a black resist using the printing technique, or by using silicone rubber containing carbon black or a metal film such as chrome.

Like Embodiment 5, such a light blocking section 34 can prevent a viewer in front of the liquid crystal display device from seeing light of the back light coming through the substrate joint 12, thereby making the connecting line in the active matrix substrate 1 less noticeable. Consequently, the structure of this embodiment can provide a natural image without awkwardness, and achieve further improved display quality.

Embodiment 7

Referring now to the drawings, the following description will explain another embodiment of the present invention. The members having the same function as in the above-mentioned embodiment will be designated by the same code and their description will be omitted.

Figure 11:
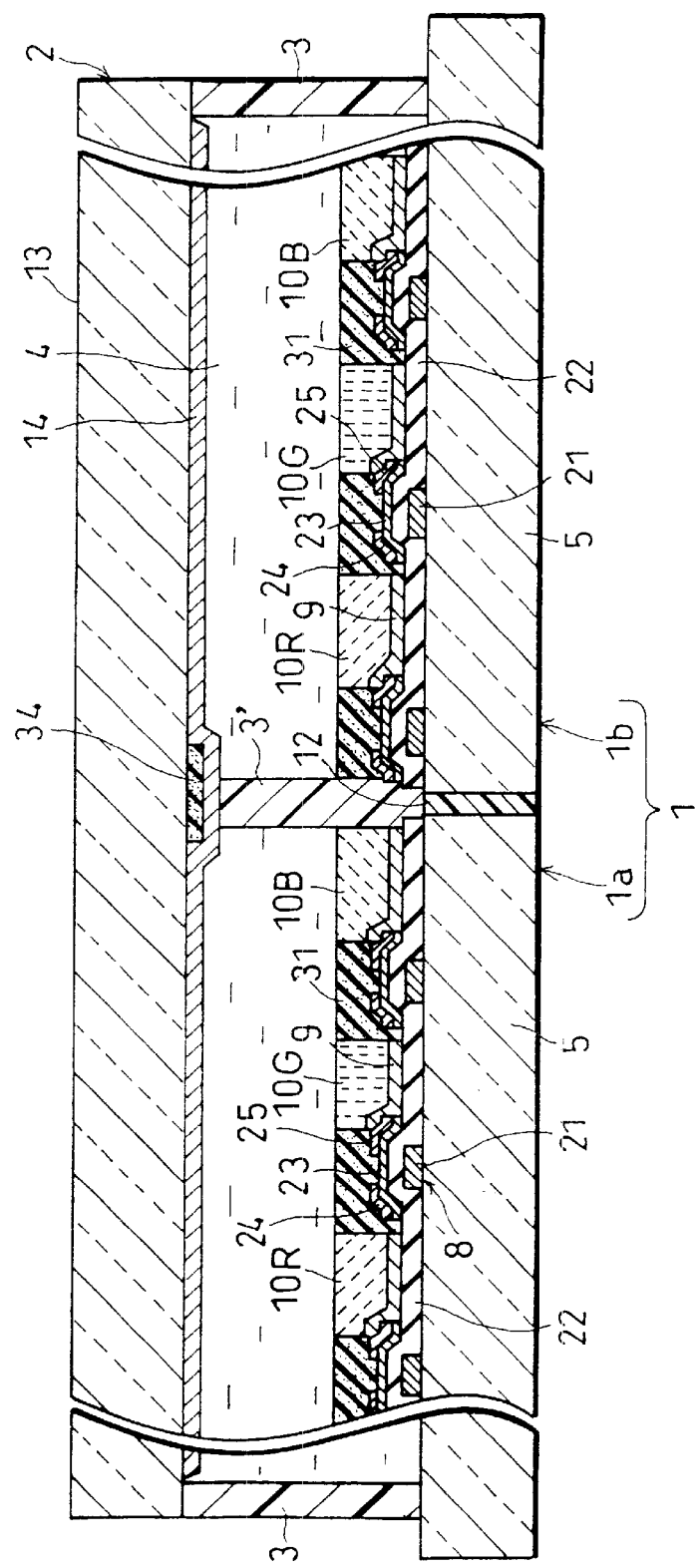
FIG. 11 is a cross section of a liquid crystal panel of a liquid crystal display device according to other embodiment of the present invention.

The liquid crystal panel of a liquid crystal display device according to this embodiment has the structure shown in FIG. 11. In addition to the structure of the liquid crystal panel of Embodiment 6 shown in FIG. 10, the liquid crystal panel of Embodiment 7 includes the seal layer 3'. As explained in Embodiment 3, the seal layer 3' fills the gap between the active matrix substrate 1 and the counter substrate 2.

Like Embodiment 3, in this embodiment, in order to prevent variations in the thickness of the liquid crystal layer 4 over the entire display area of the liquid crystal display device, it is possible to provide the seal layer 3' not only along the substrate joint 12, but also at a plurality of positions in the form of islands on the black matrix 31 formed on the entire display area. Namely, the seal layer 3' can be placed at a plurality of positions discontinuously so as not to prevent the injection of liquid crystals during the production of the liquid crystal display device.

Embodiment 8

Referring now to the drawings, the following description will explain other embodiment of the present invention. The members having the same function as in the above-mentioned embodiment will be designated by the same code and their description will be omitted.

Figure 12:
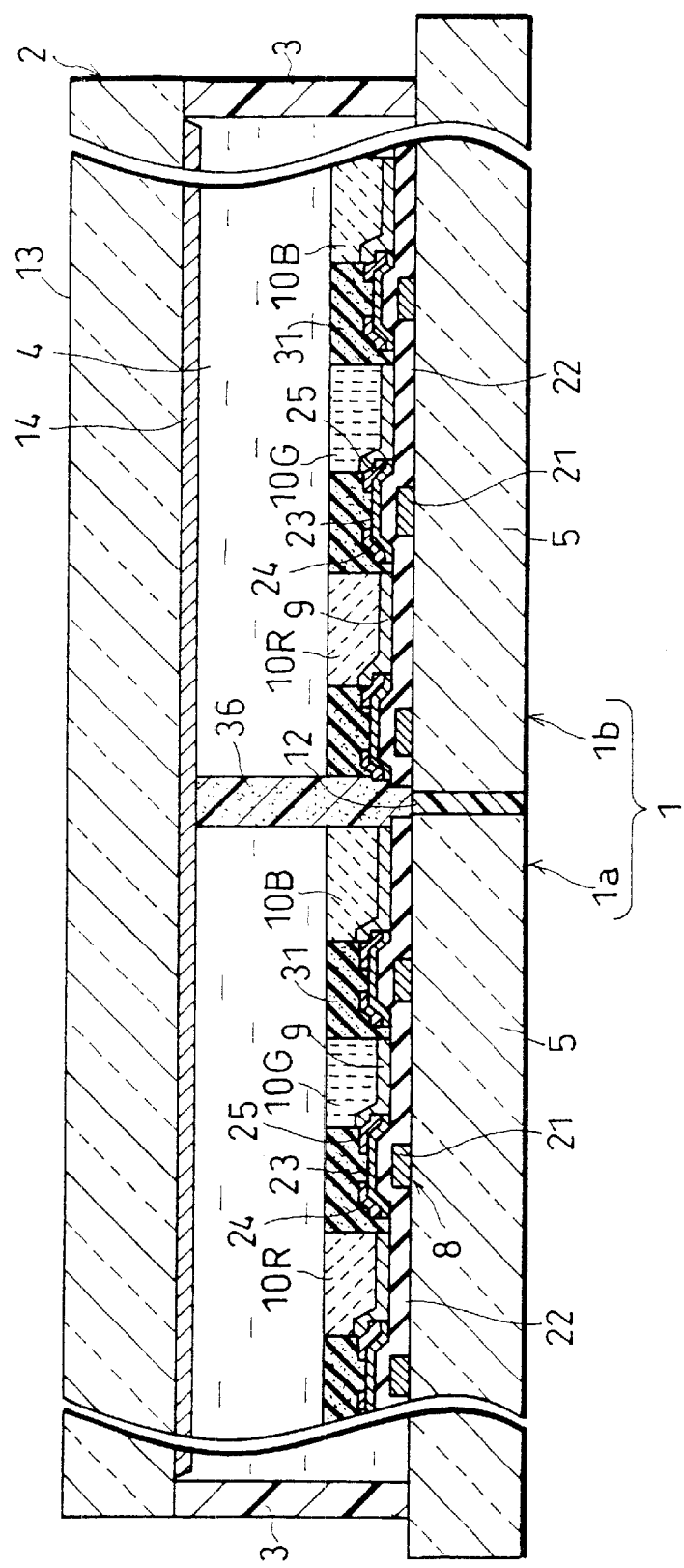
FIG. 12 is a cross section of a liquid crystal panel of a liquid crystal display device according to other embodiment of the present invention.
Figure 13:
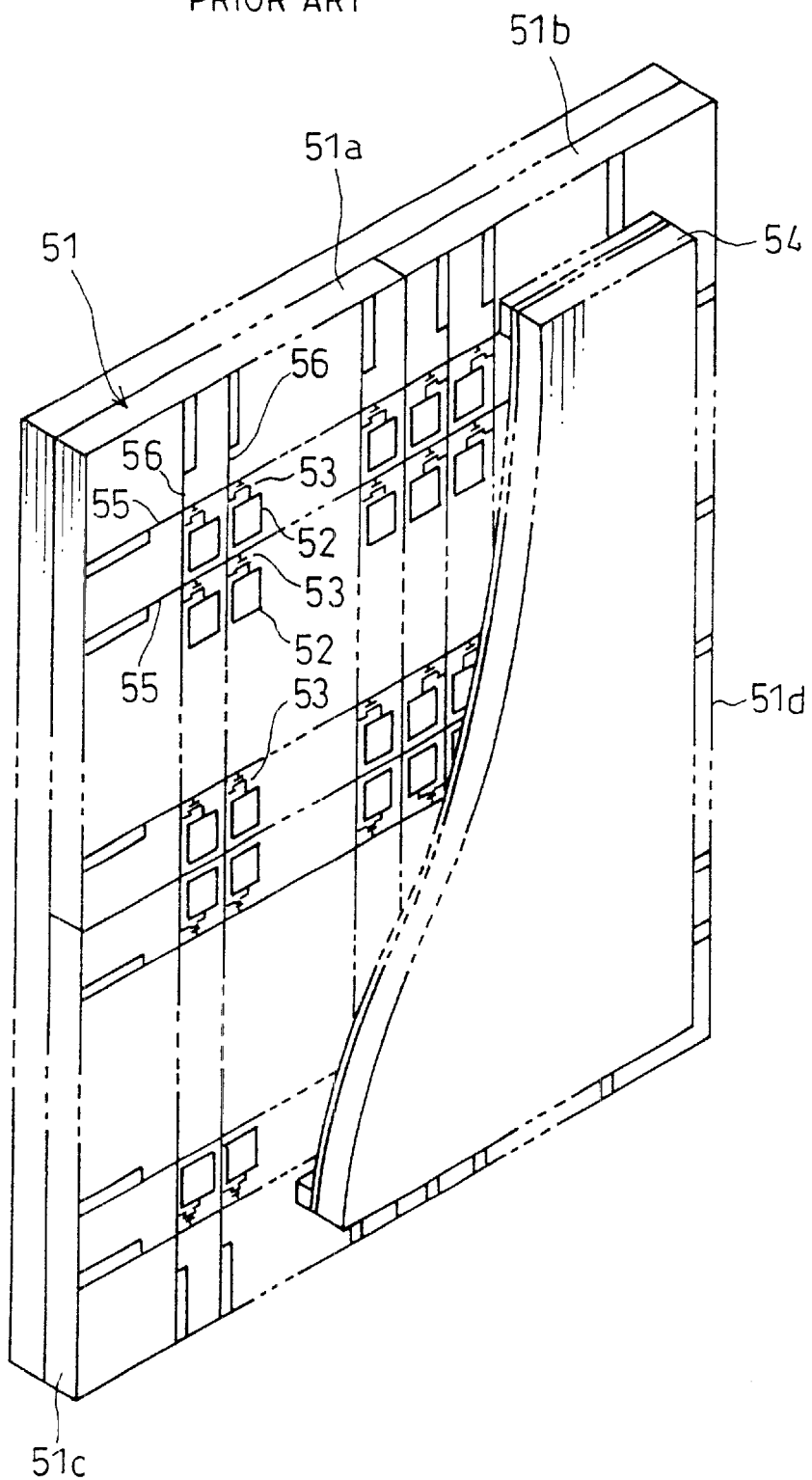
FIG. 13 is a perspective view of a conventional liquid crystal display device including an active matrix substrate formed by a plurality of divisional substrates.

The liquid crystal panel of a liquid crystal display device according to this embodiment has the structure shown in FIG. 12. The structure of the liquid crystal panel of Embodiment 8 is similar to that of the liquid crystal panel of Embodiment 7 shown in FIG. 11, and includes a light blocking seal layer 36 with a light blocking property, instead of the seal layer 3' of Embodiment 7, but does not have the light blocking section 34 that is formed on the counter substrate 2 to cover the substrate joint 12 in Embodiment 7.

As the material for the light blocking seal layer 36, it is possible t o use a black sealant. Preferred examples of the black sealant include thermosetting epoxy sealants and ultraviolet-setting acrylic sealants containing pigment such as carbon black. However, it is possible to use other black resins.

With the use of the light blocking seal layer 36, since the light blocking section 34 is not required, the same effect as that produced by the liquid crystal display device of Embodiment 7 can be produced by simpler production steps.

As described above, a liquid crystal display device of the present invention includes an active matrix substrate produced by connecting side by side a plurality of divisional substrates which are divided to such a degree that all the active elements are operable, and have thereon filters corresponding to pixel electrodes.

With this structure, even when an active matrix substrate having a maximum area obtainable by a conventional production line is used as a divisional substrate, it is not necessary for the production line of the counter substrate to have a new color filter production line corresponding to the large substrate. It is therefore possible to suppress the increase in the overall price of the display device, thereby providing a large-area liquid crystal display device at a low price.

Moreover, a liquid crystal display device of the present invention may include a first light blocking film placed in a matrix form on the counter substrate to cover the active elements as well as the gap between the pixel electrodes.

This structure prevents the leakage of light through the gap between the pixels, and generation of a leakage current due to the incidence of light on the active elements. Consequently, the display quality is improved.

Furthermore, a liquid crystal display device of the present invention may include a first light blocking film arranged in a matrix form on the counter substrate to cover the active elements as well as the gaps between the pixel electrodes, and a seal layer placed along the joint of the divisional substrates to fill the gap between the active matrix substrate and the counter substrate.

With this structure, the display quality is improved by the first light blocking film, and the bonding strength of the divisional substrates is improved by the seal layer filling the gap between the active matrix substrate and the counter substrate. As a result, the display quality and the mechanical strength of the liquid crystal display device are further increased, thereby achieving improved reliability.

Besides, a liquid crystal display device of the present invention may include on each divisional substrate a first light blocking film in the form of a matrix for covering the active elements as well as the gap between the pixel electrodes.

With this structure, the display quality is improved by the first light blocking film. Additionally, in this structure, since each of the divisional substrates is provided with the first light blocking film, it is not necessary to form the first light blocking film on the counter substrate. Thus, a device for producing the first light blocking film on the large substrate is not required. Consequently, it is possible to provide a liquid crystal display device at a low price.

Moreover, a liquid crystal display device of the present invention may include a first light blocking film produced in a matrix form on each divisional substrate to cover the active elements as well as the gap between pixel electrodes, and a second light blocking film formed on the active matrix substrate along the joint of the divisional substrates to cover the joint.

With this structure, the display quality is improved by the first light blocking film, and the joint of the divisional substrates is made less noticeable by the second light blocking film formed along the joint. Consequently, further improved display quality is achieved.

Moreover, a liquid crystal display device of the present invention may include a first light blocking film produced in a matrix form on each divisional substrate to cover the active elements as well as the gap between pixel electrodes, and a second light blocking film for covering the joint of the divisional substrates at a position on the counter substrate corresponding to the joint.

With this structure, the display quality is improved by the first light blocking film, and the connecting line of the divisional substrates is made less noticeable by the second light blocking film formed along the joint. Consequently, further improved display quality is achieved.

Furthermore, a liquid crystal display device of the present invention may include a first light blocking film produced in a matrix form on each divisional substrate to cover the active elements as well as the gap between pixel electrodes, and a second light blocking film for covering the joint of the divisional substrates at a position on the counter substrate corresponding to the joint.

In this structure, the display quality is improved by the first light blocking film, and the connecting line of the divisional substrates is made less noticeable by the second light blocking film formed along the joint. Consequently, further improved display quality is achieved.

Besides, a liquid crystal display device of the present invention may include a first light blocking film produced in a matrix form on each divisional substrate to cover the active elements as well as the gap between pixel electrodes, a second light blocking film formed at a position on the counter substrate corresponding to the joint of the divisional substrates so as to cover the joint, and a seal layer provided along the joint of the divisional substrates to fill the gap between the active matrix substrate and counter substrate.

In this structure, the display quality is improved by the first and second light blocking films, and the bonding strength of the divisional substrates is improved by the seal layer filling the gap between the active matrix substrate and counter substrate. In this case, since the seal layer is masked by a third light blocking film formed along the joint, the seal layer is not noticeable and does not lower the display quality. Consequently, the display quality and mechanical strength of the liquid crystal display device are increased, thereby achieving improved reliability.

Moreover, a liquid crystal display device of the present invention may include a first light blocking film produced in a matrix form on each divisional substrate to cover the active elements as well as the gap between pixel electrodes, and a light blocking seal layer formed along the joint of the divisional substrates to fill the gap between the active matrix substrate and counter substrate and cover the joint.

In this structure, the display quality is improved by the first light blocking films, and the connecting line of the divisional substrates is made less noticeable and the bonding strength of the divisional substrates is enhanced by the light blocking seal layer. Consequently, the display quality and mechanical strength of the liquid crystal display device are increased, thereby achieving improved reliability.

Furthermore, in a liquid crystal display device, the seal layer may contain a spacing member for maintaining a predetermined distance between the active matrix substrate and counter substrate.

With the use of the spacing member, the distance between the active matrix substrate and counter substrate is made uniform. It is thus possible to prevent variations in the thickness of the liquid crystal layer, and maintain good display quality. In the case of a liquid crystal display device having a large-area display, the thickness of the liquid crystal layer tends to vary more easily as compared to a small-area display. Thus, this structure is particularly effective for the large-area liquid crystal display device.

Besides, a liquid crystal display device of the present invention may include a transparent reinforcing substrate on a surface of the active matrix substrate, opposite to a surface on which the liquid crystal layer is provided.

With this structure, since the mechanical strength of the joint in the active matrix substrate is enhanced by the transparent reinforcing substrate, the mechanical strength of the liquid crystal display device is increased, thereby achieving further improved reliability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device comprising:
    an active matrix substrate including electrode wiring produced in a matrix form by a plurality of scanning lines and a plurality of signal lines arranged to intersect said scanning lines, pixel electrodes, and active elements for driving said pixel electrodes, said pixel electrode and active element being disposed at each intersection of said electrode wiring, said active matrix substrate being a piece of substrate produced by connecting a plurality of divisional substrates side by side, each divisional substrate being provided with color filters corresponding to the pixel electrodes, respectively;
    a counter substrate being a single substrate having a common electrode, said counter substrate being disposed to face said active matrix substrate; and
    a liquid crystal layer placed between said active matrix substrate and said counter substrate.

2. The liquid crystal display device as set forth in claim 1, wherein said counter substrate includes an inter-pixel light blocking film for covering said active elements and a gap between said pixel electrodes.

3. The liquid crystal display device as set forth in claim 2, further comprising a seal layer, provided along a joint of said divisional substrates, for filling a gap between said active matrix substrate and said counter substrate.

4. The liquid crystal display device as set forth in claim 3, wherein said seal layer contains a spacing member for maintaining a predetermined thickness of said liquid crystal layer.

5. The liquid crystal display device as set forth in claim 3, wherein said seal layer is provided at a plurality of positions discontinuously on said inter-pixel light blocking film.

6. The liquid crystal display device as set forth in claim 1, wherein each of said divisional substrates includes an inter-pixel light blocking film for covering said active elements and a gap between said pixel electrodes.

7. The liquid crystal display device as set forth in claim 6, wherein said active matrix substrate includes a joint light blocking film for covering a joint of said divisional substrates, said joint light blocking film being formed along the joint.

8. The liquid crystal display device as set forth in claim 6, wherein said counter substrate has a joint light blocking film for covering a joint of said divisional substrates, said joint light blocking film being formed along the joint.

9. The liquid crystal display device as set forth in claim 8, further comprising a seal layer, provided along a joint of said divisional substrates, for filling a gap between said active matrix substrate and said counter substrate.

10. The liquid crystal display device as set forth in claim 9, wherein said seal layer contains a spacing member for maintaining a predetermined thickness of said liquid crystal layer.

11. The liquid crystal display device as set forth in claim 6, further comprising a light blocking seal layer, provided along a joint of said divisional substrates, for filling a gap between said active matrix substrate and said counter substrate and for covering the joint.

12. The liquid crystal display device as set forth in claim 11, wherein said seal layer contains a spacing member for maintaining a predetermined thickness of said liquid crystal layer.

13. The liquid crystal display device as set forth in claim 1, wherein said counter substrate has a joint light blocking film for covering a joint of said divisional substrates, said joint light blocking film being formed along the joint.

14. The liquid crystal display device as set forth in claim 1, wherein said active matrix substrate has a joint light blocking film for covering a joint of said divisional substrates, said joint light blocking film being formed along the joint.

15. The liquid crystal display device as set forth in claim 1, further comprising a seal layer, provided along a joint of said divisional substrates, for filling a gap between said active matrix substrate and said counter substrate.

16. The liquid crystal display device as set forth in claim 15,
wherein said seal layer has a light blocking property.

17. The liquid crystal display device as set forth in claim 15,
wherein said seal layer contains a spacing member for maintaining a predetermined thickness of said liquid crystal layer.

18. The liquid crystal display device as set forth in claim 1, further comprising a transparent reinforcing substrate on a surface of said active matrix substrate, opposite to a surface on which said liquid crystal layer is provided.

19. The liquid crystal display device as set forth in claim 1,
wherein said pixel electrodes are disposed closer to said common electrode than said color filters to said common electrode.

20. The liquid crystal display device as set forth in claim 1,
wherein said color filters are formed by a conducting material.

* * * * *